(12) United States Patent
Oh

(10) Patent No.: US 7,426,607 B2
(45) Date of Patent: Sep. 16, 2008

(54) MEMORY SYSTEM AND METHOD OF OPERATING MEMORY SYSTEM

(75) Inventor: Jong-Hoon Oh, Chapel Hill, NC (US)

(73) Assignee: Infineon Technologies AG, Munich (DE)

(*) Notice: Subject to any disclaimer, the term of this patent is extended or adjusted under 35 U.S.C. 154(b) by 271 days.

(21) Appl. No.: 11/198,246

(22) Filed: Aug. 5, 2005

(65) Prior Publication Data

US 2007/0033336 A1 Feb. 8, 2007

(51) Int. Cl.
*G06F 12/00* (2006.01)

(52) U.S. Cl. .................. 711/104; 711/100; 711/102; 711/103; 711/104; 711/105; 711/111; 711/112; 711/167; 711/168; 710/3; 710/4; 710/5; 710/6; 710/7; 710/36; 710/37; 710/38; 710/240; 365/189.011; 365/189.04; 365/189.19; 365/230.02; 365/230.03

(58) Field of Classification Search .................. 711/100, 711/102–103, 104, 115; 365/189.01, 189.05, 365/230.01, 230.03, 230.08, 189.011, 189.04, 365/189.19, 230.02; 710/1, 3–4, 5–7, 36–38, 710/240
See application file for complete search history.

(56) References Cited

U.S. PATENT DOCUMENTS

| | | | |
|---|---|---|---|
| 5,999,476 A | 12/1999 | Dutton et al. | |
| 6,523,755 B2 * | 2/2003 | Shinohara | 235/492 |
| 6,647,439 B1 | 11/2003 | Nouvet et al. | |
| 6,785,892 B1 | 8/2004 | Miller et al. | |
| 6,832,269 B2 | 12/2004 | Huang et al. | |
| 6,891,543 B2 | 5/2005 | Wyatt | |
| 6,898,678 B1 | 5/2005 | Six et al. | |
| 6,925,522 B2 * | 8/2005 | Pang | 711/103 |
| 7,017,038 B1 * | 3/2006 | LaChance et al. | 713/2 |
| 2005/0163468 A1 | 7/2005 | Takahashi et al. | |
| 2006/0013198 A1 * | 1/2006 | Shore et al. | 370/352 |

FOREIGN PATENT DOCUMENTS

WO 9534030 12/1995

OTHER PUBLICATIONS

A German Office Action Application No. 10 2006 035 870.8-53 mailed Apr. 13, 2007 (7 pgs.).
Office Action for Chinese Patent Application No. 200610151557.0 mailed on May 9, 2008 (11 pages).

* cited by examiner

*Primary Examiner*—Hong Kim
*Assistant Examiner*—Zhuo H Li
(74) *Attorney, Agent, or Firm*—Dicke, Billig & Czaja, PLLC

(57) ABSTRACT

A random access memory system has a memory controller, a first memory device, a second memory device, and a memory bus. The memory controller is configured to control access to a plurality of memory devices. The memory bus is configured to alternatively couple the memory controller to the first memory device and to couple the memory controller to the second memory.

12 Claims, 5 Drawing Sheets

MEMORY SYSTEM AND METHOD OF OPERATING MEMORY SYSTEM

BACKGROUND

The present invention relates to a semiconductor memory system, and in particular, to a memory system including a shared interface for semiconductor memories.

In many applications utilizing semiconductor memories, often flash memory and random access memory (RAM) are utilized within the same system. For example, many mobile applications, such as cellular phones, used NAND flash memory to store code and use low-power RAM to allow execution at faster speeds. For example, low-power single data rate (LP-SDR) or low-power double data rate (LP-DDR) can be provided to allow fast speed execution, while a NAND or NOR flash memory may be provided to store code. In many memory subsystems with multimedia functions, which are increasingly popular in many mobile applications, this combination of NAND flash and LP-DDR or LP-SDR memories have become quite common.

In many applications, including mobile applications, there is an every increasing drive to minimize size of all components, including memory components. Although there are advantages to including both flash memory and LP-SDR or LP-DDR memories providing both types of memory, typically involved providing access from a host processor to each of the memory devices over an external memory bus. Each external memory bus will occupy a number of pins and space on the printed circuit board.

For these and other reasons, there exists a need for the present invention.

SUMMARY

One aspect of the present invention provides a random access memory system with a memory controller, a first memory device, a second memory device, and a memory bus. The memory controller is configured to control access to a plurality of memory devices. The memory bus is configured to alternatively couple the memory controller to the first memory device and to couple the memory controller to the second memory.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1B:
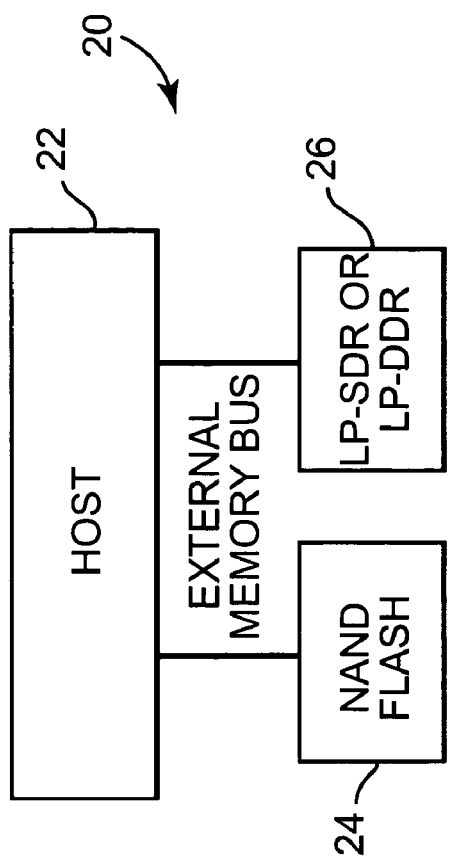
FIG. 1B illustrates a block diagram of a system having a flash memory and a RAM.
Figure 1A:
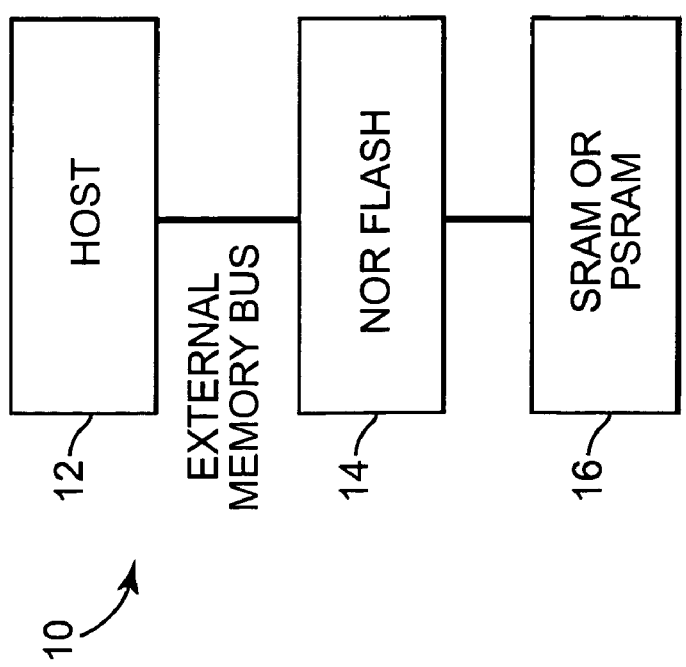
FIG. 1A illustrates a block diagram of a system having a flash memory and a RAM.

FIG. 1A illustrates memory subsystem 10. Memory subsystem 10 includes host memory controller 12, flash memory 14, and random access memory (RAM) 16. Flash memory 14 is coupled to host memory device 12 via an external memory bus. Flash memory 14 is further coupled to RAM 16 via an external memory bus. In one case, flash memory 14 is a NOR flash device and RAM 16 is an SRAM. In another case, flash memory 14 is a NAND flash device and/or RAM 16 a PSRAM.

In one application, memory subsystem 10 may be suitable for application in a low to mid-range cellular phone segment. In one such a case, application software is resident on flash memory 14 in the form of execute-in-place (XIP) code. Since flash memory tends to be relatively slower, the XIP code in flash memory 14 then utilizes RAM 16 as working memory when more speed is needed.

FIG. 1B illustrates memory subsystem 20. Memory subsystem 20 includes host memory controller 22, flash memory 24 and random access memory (RAM) 26. Host memory controller 22 is coupled to both flash memory 24 and RAM 26 via an external memory bus, which in one case provides parallel connection of both memory devices to memory controller 22. In one case, RAM 26 is a low-power single data rate (LP-SDR) RAM and flash memory 24 is a NAND flash device. In another case, RAM 26 is a low-power double data rate (LP-DDR) RAM, and/or flash memory 24 is a NOR flash device.

In operation, memory subsystem 20 is suitable for application in mid to high-range cellular phones segments. In one such environment, memory system 20 utilizes flash memory 24 to store application code and data, and then uses a faster RAM 26 for execution and work with the data. In a typical configuration, the connection between host memory controller 22 and flash memory 24 is slow relative to the connection between host controller 22 and RAM 26. A system configured as memory subsystem 20 may utilize a shadowing technique where code resident in flash memory 24 is mainly working with a low-power SDR or DDR such as RAM 26.

Figure 2:
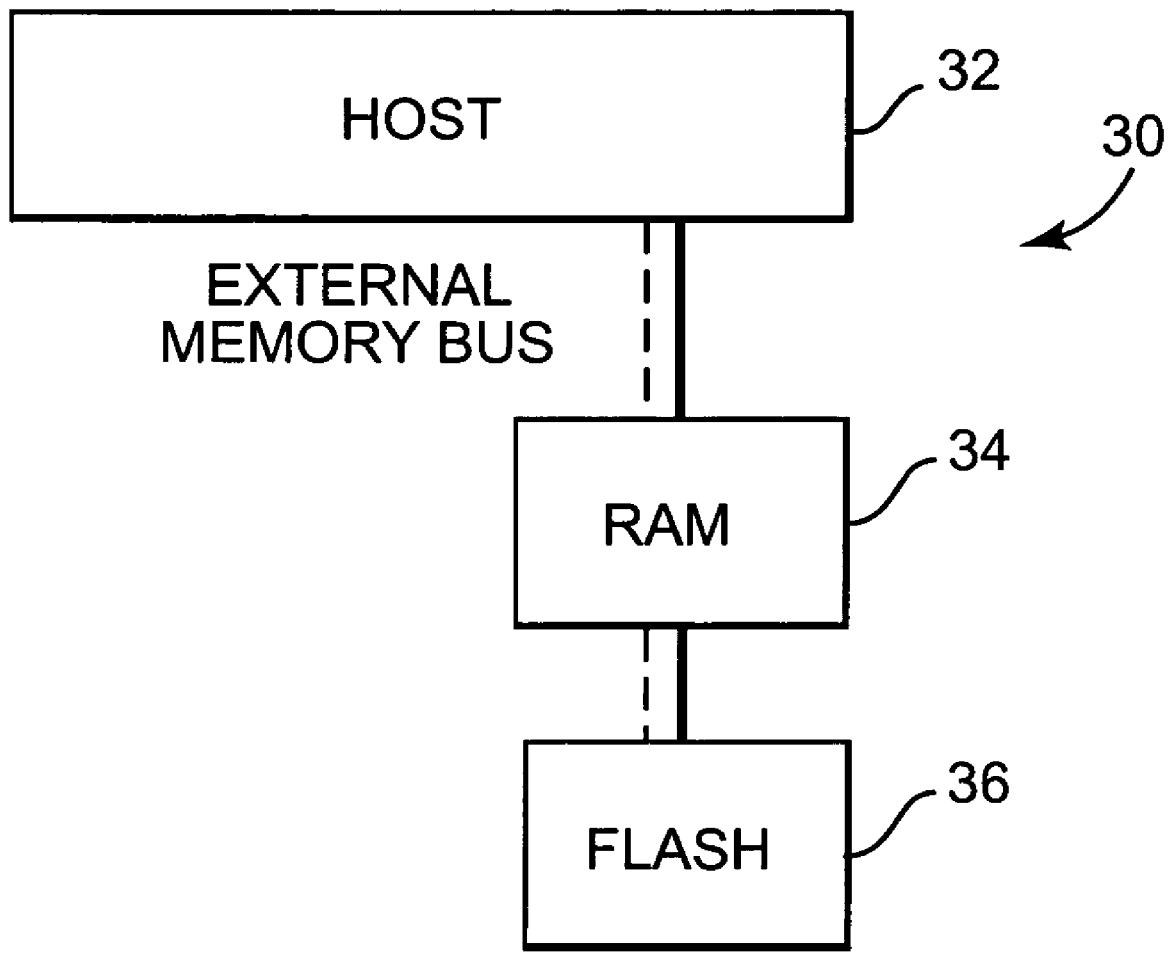
FIG. 2 illustrates a system having a RAM and a flash memory with a shared interface in accordance with one embodiment of the present invention.

FIG. 2 illustrates memory subsystem 30 in accordance with one embodiment of the present invention. Memory subsystem 30 includes host memory controller 32, random access memory (RAM) 34 and flash memory 36. Host controller 32 and RAM 34 are coupled via an external memory bus. Furthermore, flash memory 36 and RAM 34 are coupled to host memory controller 32 via the same external memory bus and are multiplexed with host memory controller 32. In one case, RAM 34 is a low-power single data rate (LP-SDR) RAM and flash memory 36 is a NAND flash device. In another case, RAM 34 is a low-power double data rate (LP-DDR) RAM, and/or flash memory 36 is a NOR flash device.

In one application, memory subsystem 30 is suitable for application in middle to high-end cellular phone segments. In such a system, application software and data are stored mainly in flash memory 36. Host memory controller 32 then accesses this code, and any data in flash memory 36, via the external memory bus. Furthermore, via multiplexing of at least some of the control pins of the RAM 34 and flash memory 36, host controller 32 can also access RAM 34 via the same external memory bus, and utilize this low-power high-speed RAM to perform operations there. When data needs to be permanently stored or additional code needs to be accesses, host controller 32, again via multiplexing, can access flash memory 36 for these purposes.

By eliminating a separate external memory bus connected to flash 36, significant space can be saved on the printed circuit board or other location where memory subsystem 30 is resident. In addition, a multitude of pins may be eliminated in a memory subsystem such as memory subsystem 30. In one case, over 20 pins dedicated exclusively between host memory controller 32 and flash memory 36 are eliminated by having flash memory 36 and RAM 34 share an external memory bus with multiplexing.

Figure 3:
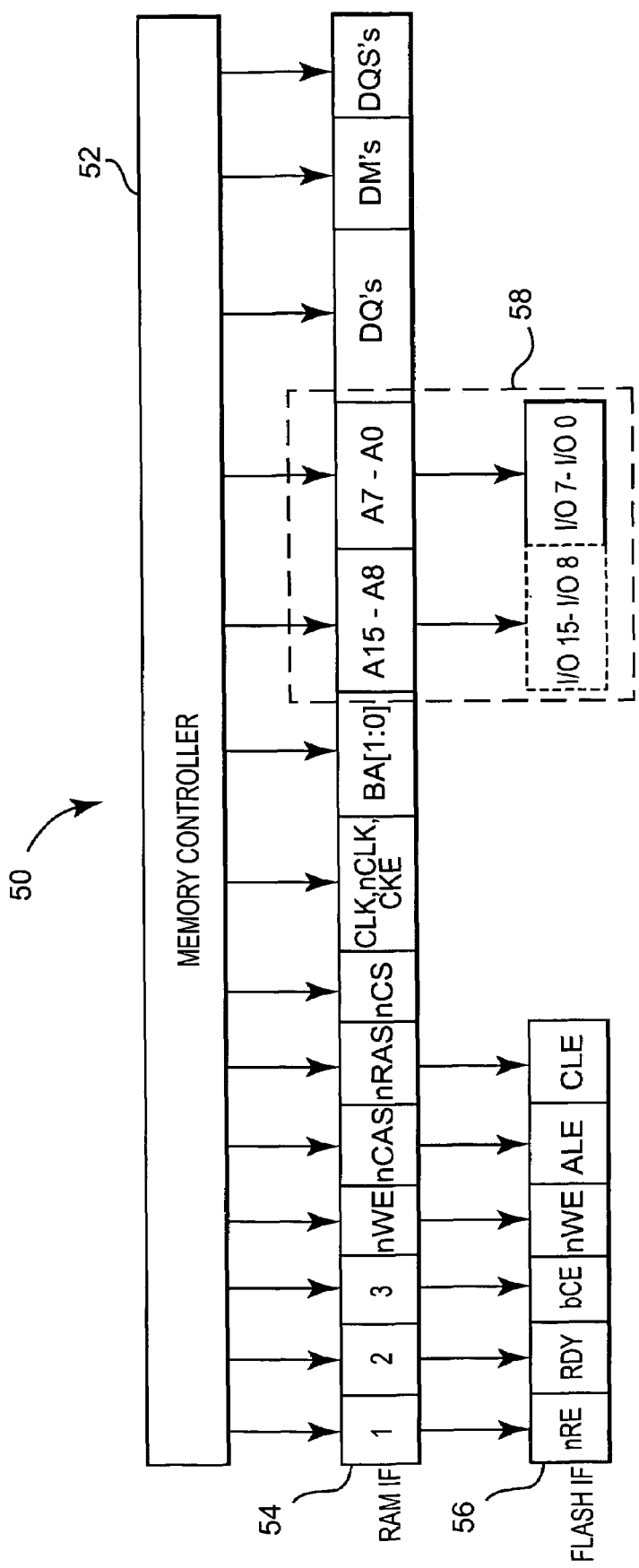
FIG. 3 illustrates a portion of a pin interface of a memory subsystem in accordance with one embodiment of the present invention.

FIG. 3 illustrates further detail of a memory subsystem 50 in accordance with one embodiment of the present invention. Specific pin interface of memory subsystem 50 is illustrated. Memory subsystem 50 includes memory controller 52, RAM interface 54, and flash interface 56. Further, multiplexed address and data lines (MUX A/D) 58 in accordance with one embodiment of the invention, is illustrated between RAM interface 54 and flash interface 56.

RAM interface 54 includes conventional RAM interface pins. In one embodiment, RAM interface 54 is an interface for a low-power DDR or a low-power SDR type RAM device. In the illustration of FIG. 3, RAM interface 54 includes open pins 1, 2, and 3. Also illustrated are a write enable (nWE) pin, a column address strobe (nCAS) pin and a row address strobe (nRAS) pin, each of which are complimentary signals. RAM interface 54 also includes a chip select signal (nCS) pin, a clock (CLK) pin, a complimentary clock (nCLK) pin, and a clock enable (CKE) pin. RAM interface 54 also includes write mask or data mask (DM) pins, and DQ pins and DQS pins for the echo clock of DQs. In one embodiment, the DQS pins provide a right data strobe on time edge-aligned for read and center-aligned for write. In one case, the DQ is 16 bits, and in another it is 32 bits.

Flash interface 56 also includes conventional flash interface pins. In one embodiment, Flash interface 56 is an interface for a NAND flash device or a NOR flash device. Illustrated on the flash interface 56 are a read enable (nRE) pin, a ready (RDY) pin, a chip enable (bCE) pin, a write enable (nWE) pin, a address latch enable (ALE) pin and a command latch enable (CLE) pin. The read enable (nRE) pin, the ready (RDY) pin, and the chip enable (bCE) pin on the flash interface 56 are respectively coupled to pins 1, 2 and 3 (which can be used to provide additional functionality where needed) on RAM interface 54. The write enable (nWE) pins on RAM interface 54 and flash interface 56 are coupled together, and the address latch enable (ALE) pin and the command latch enable (CLE) pins on the flash interface 56 are respectively coupled to the column address strobe (nCAS) pin and the row address strobe (nRAS) pin on RAM interface 54.

In one embodiment, address and data (A/D) pins between memory controller 52 and RAM interface 54 and between memory controller 52 and flash interface 56 are multiplexed via MUX A/D 58. In one embodiment, for 16 byte applications, 16 A/D pins (A15-A0 and I/O15-I/O0) are multiplexed. In another embodiment, 8 pins A/D pins (for example, A7-A0 and I/O7-I/O0) are used in 8 byte applications. In one embodiment of memory subsystem 50, because MUX A/D 58 allows shared pin connections with memory controller 52 by both RAM interface 54 and flash interface 56, no additional pins are needed to couple flash interface 56 to memory controller 52 than are already used to couple RAM interface 54 to memory controller 52. This saves space on the PCB, and in one case, saves over 20 pins on memory controller 52.

Figure 4:
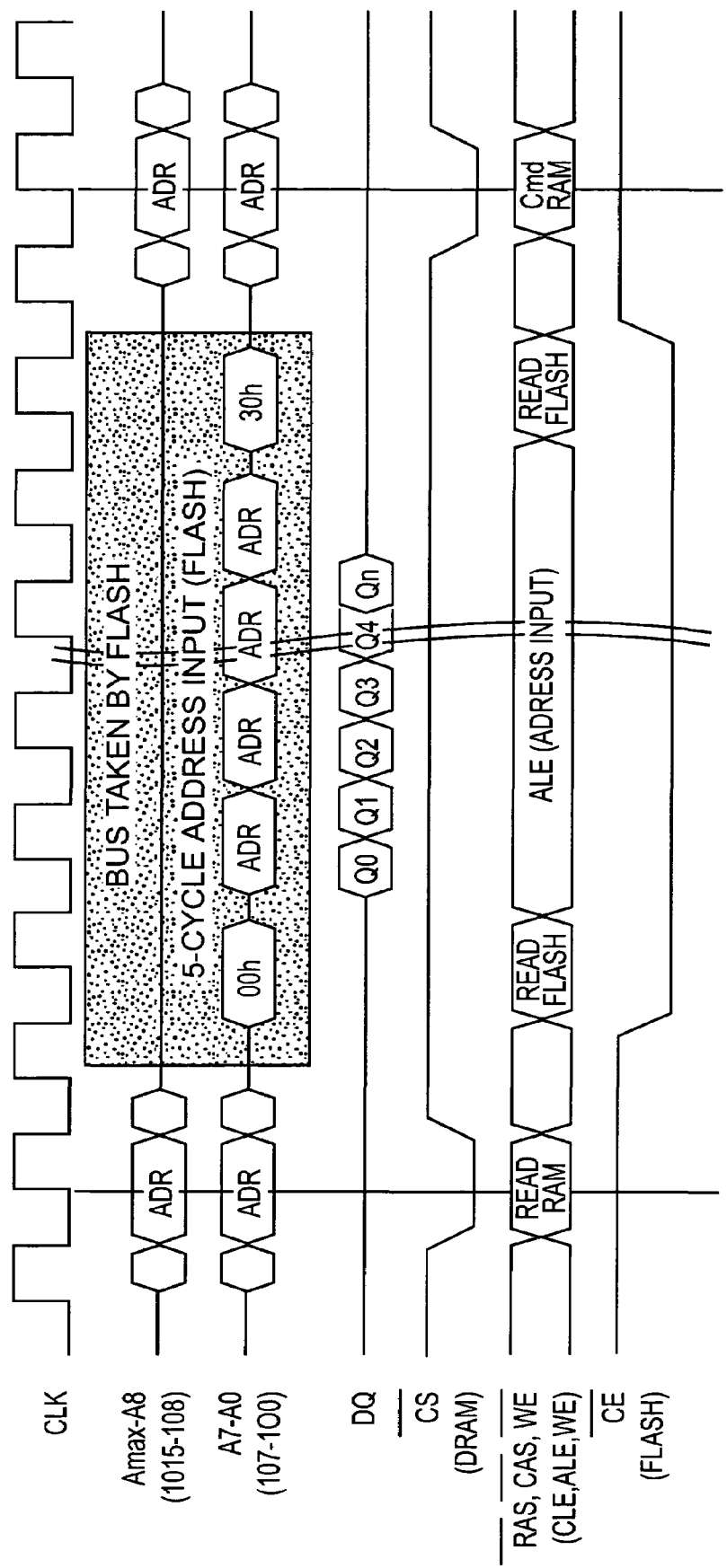
FIG. 4 illustrates an exemplary timing diagram of a memory subsystem in accordance with one embodiment of the present invention.

FIG. 4 illustrates an exemplary timing diagram of a memory subsystem, such as memory subsystem 50, in accordance with one embodiment of the present invention. Signals are temporally illustrated horizontally across the figure, and each is labeled with the corresponding pin or pins from memory subsystem 50 of FIG. 3.

In operation of memory subsystem 50, memory controller 52 alternatively accesses RAM interface 54 and flash interface 56 as needed, via MUX A/D 58. In FIG. 4, a clock signal (CLK) is illustrated at the top of the figure. On the second clock cycle in the illustration, a read command for the RAM interface 54 is applied at pins nRAS, nCAS and mWE and a corresponding address command comes in from memory controller 52 via the A/D pins, as indicated by ADR in the figure. In this way, memory controller 52 sets the address where the RAM is to be accessed. After some latency, data is then accessed from the specified address location as indicated by the DQ bus pins labeled Q0, Q1, Q2, Q3, Q4-Qn.

During this normal read operation of the RAM while the data is then being accessed from the memory, the address bus is idle such that there is no transaction relative to the RAM. In this way, memory system 50 exploits this idle time of the address bus to access commands for the flash memory. Thus, in FIG. 4, the shaded area labeled "Bus taken by NAND," illustrates how, in one embodiment, the data and address bus executes commands in the flash memory via A/D pins I/O7-I/O0. Corresponding read commands are indicated ("Read NAND) on the command CLE, ALE, nWE pins.

In one embodiment, memory controller 52 controls access to RAM and flash memory via chip select (nCS) and chip enable (bCE), respectively. As illustrated in FIG. 4, when the chip select (nCS) transitions low, the RAM takes control of the A/D bus and the command and address signals are applied for the RAM (after the second clock cycle). The chip select (nCS) then transitions high and one clock cycle later the chip enable (bCE) transitions low such that the command and address signals are applied for the flash memory.

In one embodiment, when control of the A/D bus in taken by the flash memory, it is asynchronous such that the flash memory does not have to track the main clock. Typically, the clock to the RAM, such as a low power DDR, is relatively fast, such as 100 MHz or higher. Since flash memory maintains a relatively slower access, such as a 20-25 nanosecond cycle, memory controller 52 does not have to synchronize this command with the main clock.

Figure 5:
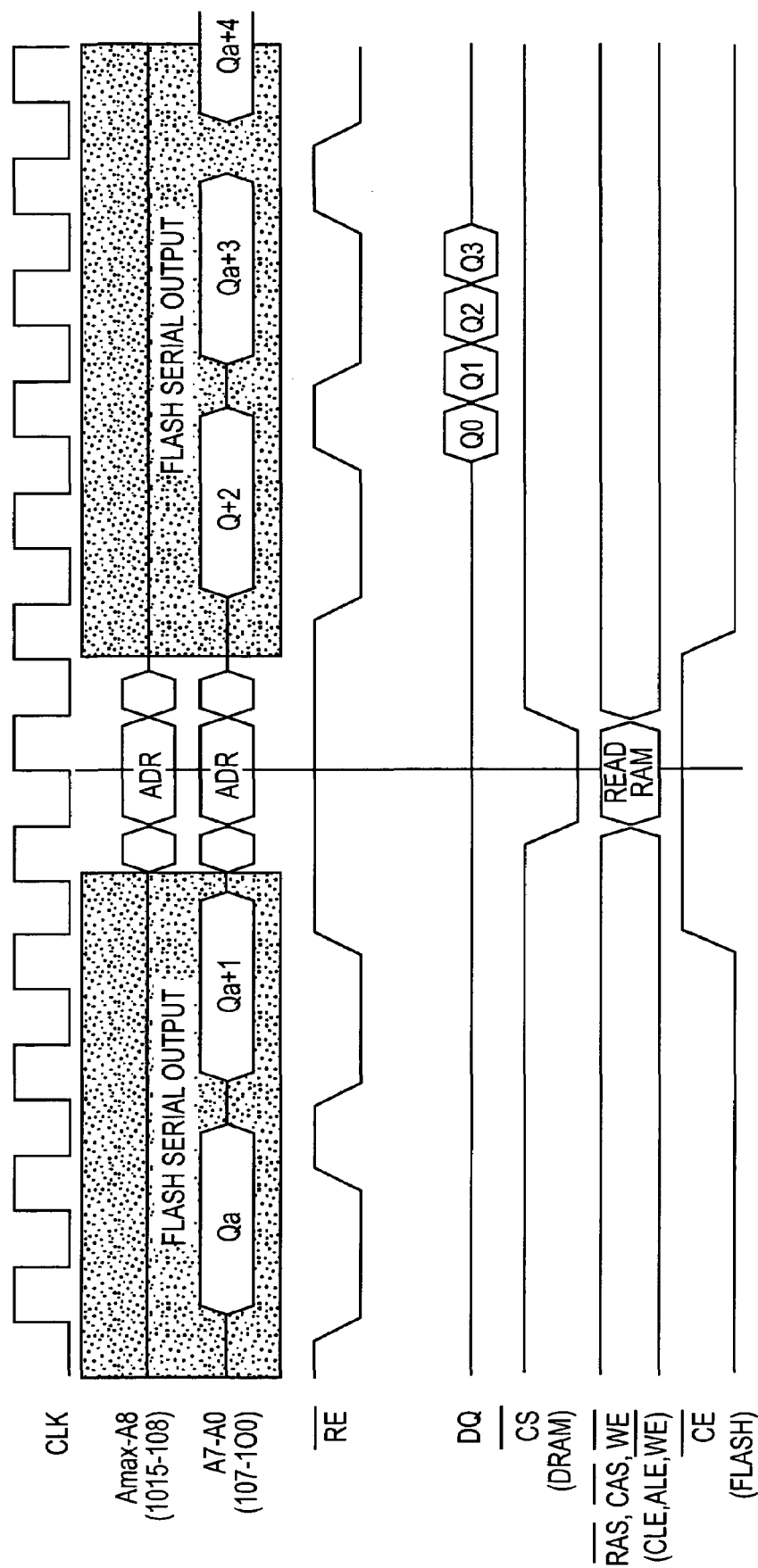
FIG. 5 illustrates an exemplary timing diagram of a memory subsystem in accordance with one embodiment of the present invention.

FIG. 5 illustrates another exemplary timing diagram of a memory subsystem, such as memory subsystem 50, in accordance with one embodiment of the present invention. Signals are temporally illustrated horizontally across the figure, and each is labeled with the corresponding pin or pins from memory subsystem 50 of FIG. 3.

In the timing diagram of FIG. 5, an additional example of accessing of the flash memory by memory controller 52 via multiplexing is illustrated. In the illustration, the flash memory is being accessed. Initially, the chip select (nCS) is high and the chip enable (nCE) is low such that the command and address signals are applied for the flash memory. Control of the A/D bus is illustrated by the shaded area labeled "NAND serial output." Here, data, such as $Qa$, $Qa+1$, etc. is read out serially.

During this readout, however, in one example memory controller 52 then has need to access the RAM. In this way, controller 52 brings the read enable (nRE) high. Then with read enable high, the flash memory releases the address bus. Further, when the chip enable (nCE) transitions high and the chip select (nCS) transitions low, the RAM takes control of the A/D bus and the command and address signals are applied for the RAM. The appropriate read command and address are then placed so the RAM is accessed. Next, the chip enable (nCE) transitions low and the chip select (nCS) transitions high so that the flash memory can continue serially reading data, $Qa+2$, $Qa+3$, $Qa+4$, etc., out of the flash memory during latency when data $Q0$, $Q1$, $Q2$, and $Q3$ are read from the RAM in response to the asserted read command.

In this way, in one embodiment, the RAM has priority and is master over the flash memory relative to the multiplexing controlled by memory controller 52. Since in one case the RAM is clocked at a relatively fast rate, for example at 100 MHz, whereas the flash memory is clocking more on the order of 5 microseconds, there is plenty of time to do much of the RAM operation and data control while the controller is otherwise waiting for the NAND data and commands.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system comprising:
   a plurality of memory devices including a first memory device and a second memory device;
   a memory bus; and
   a memory controller configured to alternatively couple the memory bus between the memory controller and the first memory device and between the memory controller and the second memory device;
   wherein the memory bus comprises a single address and data bus that the memory controller shares for both the first and second memory devices and a separate data bus for the second memory device;
   wherein the memory controller is configured to multiplex at least I/O pins for the first memory device and address control pins for the second memory device comprised in the single address and data bus; and
   wherein the memory controller is configured to read data via the separate data bus from the second memory device during reading data from the first memory device or wherein the memory controller is configured to provide an address to a flash memory device via the single address and data bus during data being read from a random access memory device via the separate data bus.

2. The system of claim 1, wherein the first memory device comprises the flash memory device and the second memory device comprises the random access memory device.

3. The system of claim 1, wherein the flash memory device comprises a NAND flash memory device and the random access memory device comprises a low-power double data rate random access memory device.

4. The system of claim 1, wherein the flash memory device comprises a NOR flash memory device and the random access memory device comprises a low-power single data rate random access memory device.

5. An electronic device having a plurality of accessible memory components comprising:
   a flash memory component having a plurality of control pins;
   a random access memory component having a plurality of control pins;
   a memory controller configured to control access to the flash memory and random access memory components; and
   a single memory bus coupled to the memory controller, wherein the memory controller is configured to alternatively couple the memory bus to the plurality of control pins of the flash memory component and to the plurality of control pins of the random access memory component so as to alternatively couple the memory controller to the flash memory and random access memory components;
   wherein the single memory bus comprises a single address and data bus that the memory controller shares for both the flash memory and the random access memory component and a separate data bus for the random access memory component;
   wherein the memory controller is configured to multiplexing at least I/O pins for the flash memory component and address control pins for the random access memory component comprised in the single address and data bus; and
   wherein the memory controller is configured to read data via the separate data bus from the random access memory component during reading data from the flash memory component or wherein the memory controller is configured to provide an address to the flash memory component via the single address and data bus during data being read from the random access memory component via the separate data bus.

6. The electronic device of claim 5, wherein the memory controller multiplexes the plurality of control pins on both the flash memory and random access memory components such that alternative access in provided to both the flash memory and random access memory components via the single memory bus.

7. The electronic device of claim 5, wherein electronic device is a cellular phone.

8. The electronic device of claim 5, wherein the flash memory component comprises a NAND flash memory device, and wherein the random access memory component comprises a low-power double data rate random access memory device.

9. A memory system comprising:
   a flash memory component;
   a random access memory component;
   means for controlling access to the flash memory and random access memory components by multiplexing a plurality of control pins on both the flash memory and random access memory components to a memory controller; and a single address and data bus shared by both the flash memory and random access memory components;

wherein at least I/O pins for the flash memory component and address control pins for the random access memory component are multiplexed over the single address and data bus;

wherein the random access memory component has separate data lines;

wherein the means for controlling access is capable of reading data via the separate data lines from the random access memory component during reading data from the flash memory component or wherein the means for controlling access is capable of providing an address to the flash memory component via the single address and data bus during data being read from the random access memory component via the separate data lines.

10. A method of controlling a memory system having a plurality of semiconductor memory devices including a flash memory component and a random access memory component, the method comprising:

alternatively coupling an address and data bus to a plurality of control pins on both the flash memory and random access memory components;

asserting a read command on the random access memory component while applying an address for the random access memory component on the address and data bus;

multiplexing asserted addresses for both the random access memory component and for the flash memory component over the same address and data bus; and asserting a read command on the flash memory component while applying an address for the flash memory component on the address and data bus;

wherein data is retrieved from the random access memory component via a separate data bus responsive to the read command and address applied for the random access memory component; and wherein the address for the flash memory component is applied on the address and data bus during the data being retrieved via the separate data bus from the random access memory component or wherein data is retrieved from the random access memory component via the separate data bus during data being retrieved via the address and data bus from the flash memory component.

11. A method of controlling a memory system having a plurality of memory components, including at least a first memory component and a second memory component, the method comprising:

alternatively coupling a single address and data bus to the first and second memory components; and multiplexing asserted addresses for both the first and second memory components over the single address and data bus;

wherein data is retrieved from the first memory component via a separate data bus responsive to an address applied for the first memory component;

wherein the address for the second memory component is applied on the single address and data bus while the data is being retrieved via the separate data bus from the first random access memory component or wherein data is retrieved from the first memory component via the separate data bus while data is being retrieved via the address and data bus from the second memory component.

12. The method of claim 11, wherein the first memory component comprises a random access memory component and wherein the second memory component comprises a flash memory component.

* * * * *